(12) United States Patent
Ishii (10) Patent No.: US 10,941,465 B2
(45) Date of Patent: Mar. 9, 2021

(54) CU-BASED SINTERED SLIDING MATERIAL, AND PRODUCTION METHOD THEREFOR

(71) Applicant: Diamet Corporation, Niigata (JP)

(72) Inventor: Yoshinari Ishii, Niigata (JP)

(73) Assignee: Diamet Corporation, Niigata (JP)

( * ) Notice: Subject to any disclaimer, the term of this patent is extended or adjusted under 35 U.S.C. 154(b) by 249 days.

(21) Appl. No.: 16/073,563

(22) PCT Filed: Feb. 21, 2017

(86) PCT No.: PCT/JP2017/006343
§ 371 (c)(1),
(2) Date: Jul. 27, 2018

(87) PCT Pub. No.: WO2017/150271
PCT Pub. Date: Sep. 8, 2017

(65) Prior Publication Data
US 2019/0032174 A1    Jan. 31, 2019

(30) Foreign Application Priority Data

Mar. 4, 2016 (JP) .............................. JP2016-042776

(51) Int. Cl.
*C22C 9/06* (2006.01)
*B22F 3/11* (2006.01)
(Continued)

(52) U.S. Cl.
CPC ................ *C22C 9/06* (2013.01); *B22F 1/007* (2013.01); *B22F 3/11* (2013.01); *B22F 5/00* (2013.01);
(Continued)

(58) Field of Classification Search
None
See application file for complete search history.

(56) References Cited

U.S. PATENT DOCUMENTS 5,938,864 A    8/1999 Tomikawa et al.
8,999,232 B2   4/2015 Ishi
(Continued)

FOREIGN PATENT DOCUMENTS

CN    1190455 A    8/1998
CN    1784502 A    6/2006
(Continued)

OTHER PUBLICATIONS

International Search Report dated May 16, 2017 for the corresponding PCT Application No. PCT/JP2017/006343.
(Continued)

*Primary Examiner* — Xiaobei Wang
(74) *Attorney, Agent, or Firm* — Leason Ellis LLP (57) ABSTRACT

The Cu-based sintered sliding material has a composition including, by mass %, 7% to 35% of Ni, 1% to 10% of Sn, 0.9% to 3% of P, and 0.5% to 5% of C, with a remainder of Cu and inevitable impurities, wherein the Cu-based sintered sliding material includes a sintered body including: alloy grains that contain Sn and C and contain a Cu—Ni-based alloy as a main component; grain boundary phases that contain Ni and P as main components and are dispersedly distributed in grain boundaries of the alloy grains; and free graphite that intervenes at the grain boundaries of the alloy grains, the Cu-based sintered sliding material has a structure in which pores are dispersedly formed in the grain boundaries of the alloy grains, and an amount of C in a metal matrix including the alloy grains and the grain boundary phases is, by mass %, 0.02% to 0.20%.

6 Claims, 1 Drawing Sheet

(51) Int. Cl.
B22F 1/00 (2006.01)
C22C 9/02 (2006.01)
B22F 5/00 (2006.01)
F16C 33/10 (2006.01)
F16C 17/02 (2006.01)
F16C 33/12 (2006.01)
B22F 5/10 (2006.01)
C22C 1/04 (2006.01)
F16C 33/14 (2006.01)
F16C 17/10 (2006.01)

(52) U.S. Cl.
CPC ............ *B22F 5/106* (2013.01); *C22C 1/0425* (2013.01); *F16C 17/02* (2013.01); *F16C 17/10* (2013.01); *F16C 33/10* (2013.01); *F16C 33/12* (2013.01); *F16C 33/14* (2013.01); *B22F 2301/10* (2013.01); *B22F 2998/10* (2013.01); *C22C 9/02* (2013.01); *F16C 2204/10* (2013.01)

(56) References Cited

U.S. PATENT DOCUMENTS

| | | | |
|---|---|---|---|
| 2003/0075016 | A1 | 4/2003 | Uenosono et al. |
| 2003/0143096 | A1 | 7/2003 | Shimizu et al. |
| 2004/0120614 | A1 | 6/2004 | Noboru et al. |
| 2006/0120639 | A1 | 6/2006 | Maruyama et al. |
| 2007/0199408 | A1 | 8/2007 | Shimizu et al. |
| 2007/0258668 | A1 | 11/2007 | Shimizu et al. |
| 2009/0011268 | A1 | 1/2009 | Shimizu et al. |
| 2009/0311129 | A1 | 12/2009 | Harakawa et al. |
| 2012/0145284 | A1 | 6/2012 | Ishii et al. |
| 2012/0204677 | A1 | 8/2012 | Ishii et al. |
| 2013/0189150 | A1 | 7/2013 | Ishii et al. |
| 2013/0223774 | A1 | 8/2013 | Ishii et al. |
| 2014/0376845 | A1* | 12/2014 | Takezoe ................ C22C 1/08 384/279 |

FOREIGN PATENT DOCUMENTS

| | | | |
|---|---|---|---|
| CN | 101748302 | * | 6/2010 |
| CN | 103602849 | A | 2/2014 |
| CN | 104073746 | A | 10/2014 |
| CN | 106086687 | A | 11/2016 |
| EP | 2639321 | A1 | 9/2013 |
| EP | 2851444 | A1 | 3/2015 |
| EP | 3190197 | A1 | 7/2017 |
| JP | 50-093210 | A | 7/1975 |
| JP | 62-133027 | A | 6/1987 |
| JP | 01-198407 | A | 8/1989 |
| JP | 2003-221602 | A | 8/2003 |
| JP | 2004-068074 | A | 3/2004 |
| JP | 2004-315940 | A | 11/2004 |
| JP | 2004-324712 | A | 11/2004 |
| JP | 2005-082867 | A | 3/2005 |
| JP | 2006-063398 | A | 3/2006 |
| JP | 2006-090482 | A | 4/2006 |
| JP | 2006-199977 | A | 8/2006 |
| JP | 4521871 | B | 8/2010 |
| JP | 2011-214152 | A | 10/2011 |
| JP | 2013-023707 | A | 2/2013 |
| JP | 2013-144849 | A | 7/2013 |
| JP | 5337884 | B | 11/2013 |
| JP | 5386585 | B | 1/2014 |
| JP | 2015-187307 | A | 10/2015 |
| WO | WO-2006/022337 | A | 3/2006 |
| WO | WO-2006/077826 | A | 7/2006 |
| WO | WO-2008/001789 | A | 1/2008 |
| WO | WO-2010/147139 | A1 | 12/2010 |
| WO | WO-2011/024941 | A | 3/2011 |
| WO | WO-2012/063785 | A1 | 5/2012 |
| WO | WO-2012/063786 | A | 5/2012 |

OTHER PUBLICATIONS

Chinese Office Action dated Nov. 4, 2019 for the corresponding Chinese Patent Application No. 201780011303.5.
Extended European Search Report dated Oct. 9, 2019 in the corresponding European Patent Application No. 17759737.4.
Japanese Office Action dated Jul. 16, 2019 for the related Japanese Patent Application No. 2016-042854.
European Search Report dated Sep. 30, 2019 for the related European Patent Application No. 17760121.8.
International Search Report dated May 16, 2017 for the related PCT Patent Application No. PCT/JP2017/008257.
Non-Final Office Action dated May 18, 2020 for the related U.S. Appl. No. 16/070,439.
Office Action dated Jun. 15, 2020 for the related U.S. Appl. No. 16/294,590.
International Search Report dated Dec. 15, 2015 for the related PCT Application No. PCT/JP2015/075751.
Office Action dated Dec. 4, 2017 for the related Chinese Patent Application No. 201580047730.X.
Extended European Search Report dated May 22, 2018 for the related European Patent Application No. 15839255.5.
Office Action in related U.S. Appl. No. 15/510,561, dated Nov. 2, 2018.
Extended European Search Report dated Feb. 20, 2018 for the related European Patent Application No. 15838869.4.
Office Action dated Jan. 3, 2018 for the related Chinese Patent Application No. 201580046121.2.
International Search Report dated Nov. 17, 2015 for the related PCT Application No. PCT/JP2015/075180.
Office Action dated Apr. 2, 2019 for the related U.S. Appl. No. 15/507,567.
Office Action dated Oct. 10, 2019 for the related U.S. Appl. No. 15/507,567.

* cited by examiner

CU-BASED SINTERED SLIDING MATERIAL, AND PRODUCTION METHOD THEREFOR

CROSS-REFERENCE TO RELATED PATENT APPLICATIONS

This application is a U.S. National Phase Application under 35 U.S.C. § 371 of International Patent Application No. PCT/JP2017/006343, filed Feb. 12, 2017, and claims the benefit of Japanese Patent Application No. 2016-042776, filed on Mar. 4, 2016, all of which are incorporated herein by reference in their entirety. The International Application was published in Japanese on Sep. 8, 2017 as International Publication No. WO/2017/150271 under PCT Article 21(2).

FIELD OF THE INVENTION

The present invention relates to a Cu-based sintered sliding material, and a production method therefor.

BACKGROUND OF THE INVENTION

In general, a rolling bearing is adopted as a bearing used under a condition of a high surface pressure or a high rotation rate. However, since the rolling bearing is expensive, development of a sliding bearing that consists of a sintered member and is usable under a condition of a high surface pressure or a high rotation rate is expected.

Japanese Unexamined Publication No. 2006-199977 discloses a bearing material obtained by highly strengthening a Cu—Ni—Sn-based alloy which is a copper-based material excellent in tribological compatibility with a mating shaft, using a spinodal decomposition treatment. PCT International Publication No. WO2012/063786 discloses a Cu—Ni—Sn—P—C-based bearing, in which Ni—P phases containing Ni and P as main components are dispersed in a base (matrix) of a bearing material, in order to solve a problem of Japanese Unexamined Publication No. 2006-199977.

Problems to be Solved by the Invention

The bearing material of Japanese Unexamined Publication No. 2006-199977 has a high hardness due to the spinodal decomposition treatment. Thus, there is a problem that it does not fit with a mating shaft from an initial stage of sliding and it rather progresses wear. In addition, in the bearing disclosed in PCT International Publication No. WO2012/063786, P is added as Cu—P or Ni—P so as to disperse phases containing Ni and P as main components in a base (matrix), and the phases have an effect of improving wear resistance. However, since P also has an effect of promoting sintering, there is a problem that a dimensional change and the variation of dimensions occurring due to sintering become large.

The present invention has been made in view of the above problems, and the present invention aims to provide a Cu-based sintered sliding material which is usable under a high rotation rate and a high surface pressure, has a small dimensional change in sintering and exhibits high productivity.

SUMMARY OF THE INVENTION

Solutions for Solving the Problems (1) A Cu-based sintered sliding material of one aspect of the present invention has a composition including, by mass %, 7% to 35% of Ni, 1% to 10% of Sn, 0.9% to 3% of P, and 0.5% to 5% of C, with a remainder of Cu and inevitable impurities, wherein the Cu-based sintered sliding material includes a sintered body including: alloy grains that contain Sn and C and contain a Cu—Ni-based alloy as a main component; grain boundary phases that contain Ni and P as main components and are dispersedly distributed in grain boundaries of the alloy grains; and free graphite that intervenes at the grain boundaries of the alloy grains, the Cu-based sintered sliding material has a structure in which pores are dispersedly formed in the grain boundaries of the alloy grains, and an amount of C in a metal matrix including the alloy grains and the grain boundary phases is, by mass %, 0.02% to 0.20%.

(2) In the Cu-based sintered sliding material of (1) a porosity may be 13% to 28%.

(3) A method for producing a Cu-based sintered sliding material of one aspect of the present invention includes: a mixing step of mixing a plurality of types of powders to obtain a mixed powder; a molding step of press-molding the mixed powder to obtain a green compact; a sintering step of sintering the green compact to obtain a sintered body; and a sizing step of sizing the sintered body, wherein the plurality of types of powders include metal powders and a graphite powder, and the plurality of types of powders are blended and mixed so as to have a total composition including, by mass %, 7% to 35% of Ni, 1% to 10% of Sn, 0.9% to 3% of P, and 0.5% to 5% of C, with a remainder of Cu and inevitable impurities, and the metal powders contain, by mass %, 0.02% to 0.20% of C.

(4) In the method for producing a Cu-based sintered sliding material of (3), in the sintering step, the green compact may be sintered at a temperature of 760° C. to 900° C.

(5) In the method for producing a Cu-based sintered sliding material of (3) or (4), a porosity of the sintered body may be made to be 13% to 28%.

Effects of the Invention

The Cu-based sintered sliding material of the present invention is a sintered material obtained by sintering Cu—Ni-based alloy grains, and wear characteristics during sliding are improved by including grain boundary phases containing Ni and P as main components. Furthermore, in the Cu-based sintered sliding material of the present invention, an amount of C in the metal matrix including (consisting of) the alloy grains and the grain boundary phases is suppressed to an appropriate value. Thus, it is possible to reduce the rate of dimensional change before and after sintering. That is, according to the present invention, it is possible to provide a sintered sliding material which hardly causes a large dimensional change such as abnormal expansion or shrinkage before and after sintering, and it can be produced with good yield. Furthermore, according to the present invention, by controlling the amount of Ni, the amount of Sn, and the amount of P contained in the metal matrix including (consisting of) the alloy grains and the grain boundary phases to be in suitable ranges, it is possible to provide a sintered sliding material that is excellent in strength and wear resistance, and is usable under a high rotation rate and a high surface pressure.

DETAILED DESCRIPTION OF THE INVENTION

Hereinafter, one embodiment of the present invention will be described with reference to the drawings.

In the drawings used in the following description, for the purpose of emphasizing a characteristic portion, there are cases where a portion that is characteristic portion is enlarged for convenience and a dimensional ratio or the like of each constituent element is not necessarily the same as an actual one. In addition, for the same purpose, some portions that are not characteristic may be omitted for illustration.

Figure 1:
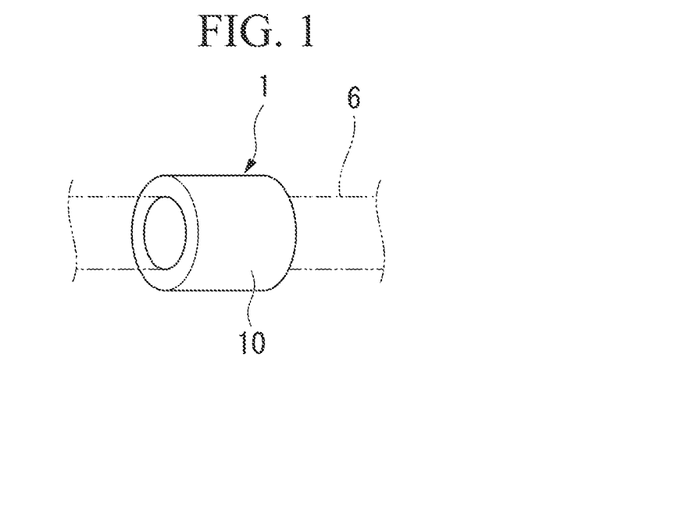
FIG. 1 is a perspective view of a bearing obtained by using a Cu-based sintered sliding material according to an embodiment.

FIG. 1 shows a ring-shaped bearing (Cu-based sintered bearing) 1 consisting of a Cu-based sintered sliding material 10 of the present embodiment. In addition, for a rotating shaft 6 supported by the bearing 1, for example, a Fe-based alloy such as stainless steel or the like is used. The rotating shaft 6 rotatably or linearly slides with respect to the bearing 1.

The bearing 1 of the present embodiment is used, for example, in a starter motor or an electric compressor of an automobile, and a control motor of an ABS. In such applications, a load applied to the bearing 1 may be a surface pressure of 10 MPa to 20 MPa and a rotation speed of 1,000 rpm to 10,000 rpm, with vibrations from an engine or the like being added. For such applications of a high load and a high rotation speed, in sliding bearings in the related art, strength thereof is insufficient and abnormal wear may occur, and therefore, the reliability is not sufficient. The sliding bearing 1 of the present embodiment has a high strength and can be used as a control motor for a throttle, a valve system, or the like of an internal combustion engine of an automobile.

Figure 2:
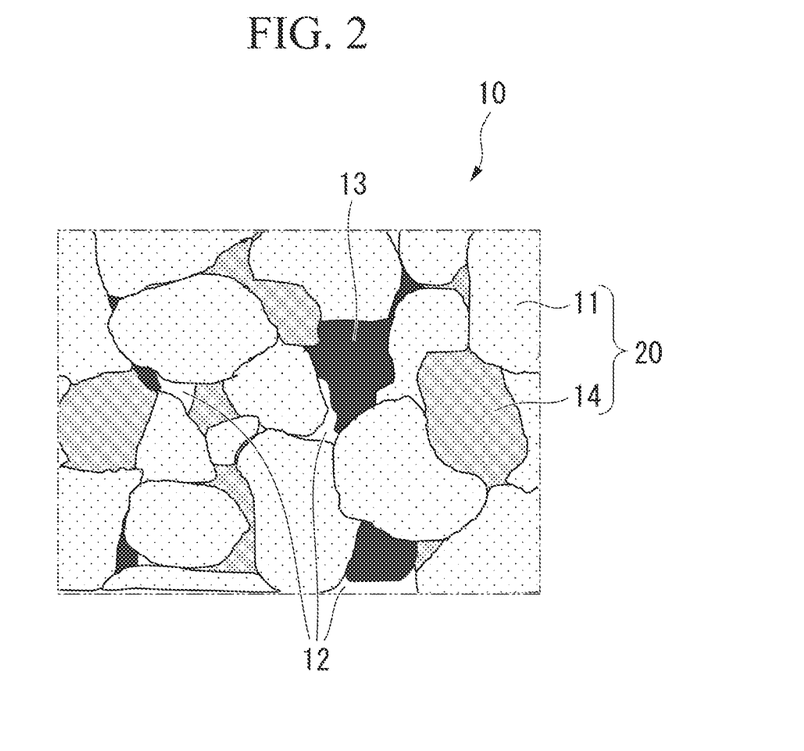
FIG. 2 is an enlarged structural diagram of the Cu-based sintered sliding material according to the embodiment.

FIG. 2 is a schematic diagram of a structure (metal structure, microstructure) obtained by observing a section of the Cu-based sintered sliding material 10 constituting the bearing 1 of the present embodiment with an optical microscope.

In the present specification, in the case where an amount of each component contained in the Cu-based sintered sliding material 10 is simply expressed as "%", it means "mass %".

As shown in FIG. 2, the Cu-based sintered sliding material 10 includes (consists of) a sintered body that includes: alloy grains 11 containing Sn and C and containing a Cu—Ni-based alloy as a main component; grain boundary phases 14 containing Ni and P as main components and are dispersedly distributed in grain boundaries of the alloy grains 11; and free graphite 13 (C (Free)) intervening at the grain boundaries of the alloy grains 11. This sintered body has a structure in which pores 12 are dispersedly formed in the grain boundaries of the alloy grains 11. In other words, the pores 12 are formed between the alloy grains 11 and formed dispersedly in the sintered body. The alloy grains 11 and the grain boundary phases 14 are integrated to constitute a metal matrix 20. In other words, the metal matrix 20 is mainly composed of metal, and includes (consists of) the alloy grains 11 and the grain boundary phases 14. In addition, the metal matrix 20 does not include the free graphite 13. That is, this sintered body includes the metal matrix 20 and the free graphite 13.

The pores 12 are dispersedly distributed in the Cu-based sintered sliding material 10. The Cu-based sintered sliding material 10 is impregnated with a lubricating oil and the inside of the pore 12 is filled with the lubricating oil. As the lubricating oil, mineral oils or synthetic oils (synthetic hydrocarbons, synthetic esters, phosphoric acid esters, fluorine-based oils, silicone oils, and the like) can be adopted, but the lubricating oil is not limited thereto.

The free graphite 13 is dispersed in the pores 12. The free graphite 13 imparts a lubricating action to the Cu-based sintered sliding material 10.

The alloy grains 11 contain a Cu—Ni-based alloy as a main component and contain Sn and C. In addition, P may be contained in the alloy grains 11. P is, for example, derived from a Cu—P alloy powder or a Ni—P alloy powder, and P is added to the Cu based sintered sliding material 10.

In addition to the above-mentioned free graphite 13, the Cu-based sintered sliding material 10 contains C which is contained in the metal matrix 20, more specifically, C which is contained, in an alloyed state, in the alloy grains 11 and in the grain boundary phases 14. Such C is derived from C contained in alloy powders (metal powders) which are raw materials before sintering of the Cu-based sintered sliding material 10. By appropriately containing C in the alloy grains 11, it is possible to stabilize a dimensional change of a sintered body before and after sintering.

The grain boundary phases 14 contain Ni and P as main components and are dispersedly distributed in the grain boundaries of the alloy grains 11. In other words, the grain boundary phase 14 exists between the alloy grains 11. In addition to Ni and P, Sn and Cu may be contained in the grain boundary phase 14. In the case where P is added by a Cu—P alloy powder, during sintering, the Cu—P alloy powder melt, and P gathers at grain boundaries of the alloy grains 11 of Cu—Ni. Then, P incorporates Ni, Sn, and Cu to form the grain boundary phase 14. Therefore, in the case where P is added by the Cu—P alloy powder, Sn and Cu are contained in the phase (grain boundary phase 14) containing Ni and P as main components. On the other hand, in the case where P is added by a Ni—P alloy powder, a part of Ni—P melts at the time of sintering, but other components (for example, Sn and Cu) are less alloyed. Thus, a grain boundary phase 14 including a small amount of other metal components is formed.

Since the grain boundary phase 14 contains a Ni—P alloy, the alloy grains 11 are tightly bonded to one another to increase the strength of the Cu based sintered sliding material 10, thereby improving wear resistance characteristics.

A method for producing the bearing 1 consisting of the Cu-based sintered sliding material 10 will be described in detail later. However, as an example thereof, the bearing 1 is obtained by a method including: uniformly mixing predetermined amounts of raw material powders (metal powders) which include either one or both of a Cu—Ni alloy powder and a Cu—Ni—Sn alloy powder, a Sn powder, a Cu—P alloy powder, and a Ni—P alloy powder, with a predetermined amount of a graphite powder; press-molding the mixture; and sintering the obtained molded body (green compact) at a temperature of 760° C. to 900° C.

The Cu-based sintered sliding material 10 has a composition including, by mass %, 7% to 35% of Ni, 1% to 10% of Sn, 0.9% to 3% of P, and 0.5% to 5% of C, with a remainder of Cu and inevitable impurities. The metal matrix 20 including (consisting of) the alloy grains 11 and the grain boundary phases 14 contains, by mass %, 0.02% to 0.20% of C. Furthermore, the alloy grains 11 may contain P. The Cu-based sintered sliding material 10 preferably has a porosity of 13% to 28%.

The reasons why the Cu-based sintered sliding material 10 constituting the bearing 1 has such preferable ranges for each composition ratio and porosity are described below.

<Ni: 7% to 35%>

Ni is alloyed with Cu, Sn, and P to form Cu—Ni—Sn phases in the alloy grains 11 and phases (grain boundary phases 14) containing Ni and P as main components in grain boundaries between the alloy grains 11, and thereby, Ni has an effect of imparting excellent strength and wear resistance. In the case where the amount of Ni is less than 7%, desired strength and wear resistance are not obtained. On the other hand, in the case where the amount of Ni exceeds 35%, it is not preferable because material cost for the sintered sliding material increases. The amount of Ni is more preferably 7.2% to 34.2% and still more preferably 12.9% to 34.2%, but is not limited thereto.

<Sn: 1% to 10%>

Due to sintering, Sn together with Ni and Cu form phases (grain boundary phases 14) containing Sn and containing Ni and P as main components in grain boundaries between Cu—Ni—Sn phase alloy grains 11, and thereby, Sn imparts excellent strength and wear resistance. In addition, by being contained in the alloy grains 11, Sn exerts an effect of imparting excellent strength and wear resistance. In the case where an amount of Sn is less than 1%, desired strength and wear resistance are not obtained. In addition, in the case where the amount of Sn exceeds 10%, a large amount of liquid phases is generated during sintering, and this causes dimensional variations and is not preferable. The amount of Sn is more preferably 1.4% to 9.2% and still more preferably 2.2% to 7.8%, but is not limited thereto.

Sn may form a Sn-rich alloy layer (not shown) containing 30% or more of Sn in an interior and on a surface of the Cu-based sintered sliding material 10. In this case, the Sn-rich alloy layer is formed on the surface of the Cu-based sintered sliding material 10 or on inner surfaces of the pores 12. The Sn-rich alloy layer can enhance corrosion resistance of the Cu-based sintered sliding material 10 against organic acids. Such Sn-rich alloy layer can be formed by adjusting the amount of Sn or a sintering condition.

<P: 0.9% to 3%>

P has an effect of increasing sinterability of a green compact and improving strength of the metal matrix 20 including (consisting of) the alloy grains 11 and the grain boundary phases 14. In addition, P together with Ni form the grain boundary phases 14 (phases containing Ni and P as main components) and thereby, P has an effect of improving wear resistance. In the case where the amount P is less than 0.9%, desired wear resistance is not obtained, and in the case where the amount P exceeds 3%, deformation of a sintered body becomes significant and product yield decreases, which is not preferable. The amount of P is more preferably 1.1% to 2.9% and still more preferably 1.5% to 2.5%, but is not limited thereto.

<C (total sum): 0.5% to 5%>

As C, there are C (Combined) which is alloyed with a base and is contained in the metal matrix 20 including (consisting of) the alloy grains 11 and the grain boundary phases 14, and C (Free) existing as the free graphite 13 between the alloy grains 11, and each C has a different action.

The Cu-based sintered sliding material 10 includes 0.5% to 5% of C as a total sum of C (Combined) contained in the metal matrix 20 including (consisting of) the alloy grains 11 and the grain boundary phases 14, and C (Free) as the free graphite 13.

<C (Combined): 0.02% to 0.20%>

The C (Combined) which is alloyed with and contained in the metal matrix 20 including (consisting of) the alloy grains 11 and the grain boundary phases 14 is derived from, for example, C contained in a Cu—Ni alloy powder and a Cu—Ni—Sn alloy powder which are raw material powders. By including a predetermined amount of C in the Cu—Ni alloy powder and the Cu—Ni—Sn powder which are raw material powders, it is possible to stabilize dimensional change during sintering of a green compact including the Cu—Ni alloy powder, the Cu—Ni—Sn alloy powder, a Sn powder, a Cu—P alloy powder, a Ni—P alloy powder, and a graphite powder.

C contained in raw material powders such as the Cu—Ni alloy powder and the like has an effect of suppressing sintering among the raw material powders.

In the case where an amount of C contained in the Cu—Ni alloy powder is less than 0.02%, sintering among the raw material powders is not suppressed, and sintering is promoted, and thereby, excessive dimensional shrinkage due to sintering occurs. Therefore, the amount of C contained in the raw material powders is preferably 0.02% or more. In addition, in this way, it is preferable that the amount of C present in the metal matrix 20, more specifically, the amount of C present in the alloy grains 11 and the grain boundary phases 14 is 0.02% or more.

Further, in the case where the amount of C contained in the raw material powders exceeds 0.20%, sintering among the raw material powders becomes more difficult to proceed and enlargement in dimension due to sintering increases. Therefore, the amount of C contained in the raw material powders is preferably 0.20% or less. In addition, in this way, it is preferable that the amount of C present in the metal matrix 20, more specifically, the amount of C present in the alloy grains 11 and the grain boundary phases 14 is 0.20% or less.

By setting the amount of C (combined) present in the metal matrix 20, more specifically, the amount of C (Combined) alloyed with the base of the alloy grains 11 and the grain boundary phases 14, to be in a range of 0.02% to 0.20%, the rate of dimensional change before and after sintering can be set to −1.5% or more and 1% or less. The amount of C (Combined) contained in the metal matrix 20 is more preferably 0.039% to 0.183% and still more preferably 0.054% to 0.092%, but is not limited thereto. The amount of C (Combined) contained in the metal matrix 20 is calculated by subtracting an amount of C (free) contained as free graphite 13 from the amount of C contained in the Cu-based sintered sliding material 10.

<C (Free): 0.3% to 4.98%>

As described above, the Cu-based sintered sliding material 10 contains 0.5% to 5% of C as a total sum of C (Combined) which is alloyed and C (Free) as the free graphite 13. In addition, the Cu-based sintered sliding material 10 contains 0.02% to 0.20% of C (Combined). Therefore, the Cu-based sintered sliding material 10 contains the free graphite 13 (C (Free)) at an amount (0.3% to 4.98%) obtained by subtracting the amount of C (Combined) from the total sum of C.

C (Free) as the free graphite 13 is derived from a graphite powder to be mixed with the raw material powders. By including 0.3% or more of C (Free), due to the C (Free), the Cu-based sintered sliding material 10 is imparted with excellent lubricity, and wear resistance thereof is improved. 0.3% or more of C (Free) has an effect of alleviating dimensional shrinkage due to sintering. On the other hand, since C (Free) contained as the free graphite 13 intervenes at (exisits in) the grain boundaries of the alloy grains 11, it may inhibit binding between the alloy grains 11 and reduce the strength of the Cu-based sintered sliding material 10. By setting the amount of C (Free) contained as the free graphite 13 to be in a range of 5% or less, it is possible to suppress deterioration of the strength and the wear resistance of the Cu-based sintered sliding material 10 to a minimum level while increasing the lubricity thereof. The amount of C (free) as the free graphite 13 is more preferably 0.501% to 4.635% and still more preferably 0.739% to 2.372%, but is not limited thereto.

<Remainder of Cu>

The Cu-based sintered sliding material 10 is suitably used as a bearing 1 for sliding a shaft of an Fe-based alloy.

In the rotating shaft 6 consisting of the Fe-based alloy, seizure easily occurs depending on a material of the bearing 1 (for example, in the case where the Fe-based alloy is adopted). With regard to the bearing 1, even in the case of sliding with the Fe-based alloy as a mating material, it is desirable that seizure hardly occurs. By using the Cu-based sintered sliding material 10, which has a composition containing Cu as a dominant component, as the bearing 1, seizure with a shaft consisting of the Fe-based alloy hardly occurs.

<Porosity: 13% to 28%>

The pores 12 are impregnated with and store a lubricating oil, and the pores 12 supply the lubricating oil when the bearing 1 slides with a mating member (for example, the rotating shaft 6 shown in FIG. 1), and thereby the pores 12 function to enhance wear resistance of the bearing 1. In the case where a porosity of the Cu-based sintered sliding material 10 is less than 13%, a sufficient amount of lubricating oil cannot be held and there may be a fear of causing wear progression. On the other hand, in the case where the porosity of the Cu-based sintered sliding material 10 exceeds 28%, the density of the Cu-based sintered sliding material 10 decreases and the strength thereof decreases, and wear progresses at a high rate under conditions of high surface pressure, which is not preferable. The porosity is more preferably 13.5% to 27.3% and still more preferably 15.7% to 23.5%, but is not limited thereto.

The porosity of the bearing 1 can be measured by the open porosity test method (JPMA M 02-1992) of sintered metal material published by the Japan Powder Metallurgy Association.

<Procedure for Producing Cu-Based Sintered Sliding Material>

A production procedure of the bearing 1 consisting of the Cu-based sintered sliding material 10 of the present embodiment will be described below.

First, as starting materials, a plurality of types of powders having predetermined average particle diameters in a range of about 10 μm to 100 μm are prepared. As the plurality of types of powders, for example, either one or both of a Cu—Ni alloy powder and a Cu—Ni—Sn alloy powder, a Sn powder, a Cu—P alloy powder, a Ni—P alloy powder, and a graphite powder are exemplified. In addition, in order to adjust a component composition of Cu and Ni, a Cu powder and a Ni powder may be further prepared. Here, the plurality of types of powders are classified into metal powders such as the Cu—Ni alloy powder, the Cu—Ni—Sn alloy powder, the Sn powder, the Cu—P alloy powder, and the Ni—P alloy powder, and the graphite powder. That is, the plurality of types of powders include the metal powders and the graphite powder. The Cu—Ni alloy powder and the Cu—Ni—Sn alloy powder contain, by mass %, 0.02% to 0.20% of C as an inevitable impurity.

Next, these powders are mixed so as to achieve a final target composition ratio, and then a lubricant such as zinc stearate is added at an amount of 0.1% to 1.0%, for example, about 0.5% and the mixture is mixed uniformly by a mixer for about several tens of minutes to obtain a mixed powder (mixing step). With regard to mixing, it is preferable to uniformly disperse the powders using a double cone type mixer, a V type mixer, or the like.

Next, the mixed powder is placed in a mold, and a pressure of 100 MPa to 700 MPa is applied and the mixed powder is press-molded to obtain a target shape, for example, a ring-shaped green compact (molding step).

Next, the green compact is sintered at a predetermined temperature in a range of 760° C. to 900° C. in, for example, an endothermic gas atmosphere (sintering step), and the endothermic gas atmosphere is obtained by a method which includes: mixing natural gas and air; and passing the mixture through a heated catalyst to decompose and convert the mixture. In the sintering step, by sintering the green compact at a temperature of 760° C. to 900° C., it is possible to obtain a sintered body having a metallic structure in which phases containing Ni and P as main components are dispersed in the metal matrix 20 and having a low rate of dimensional change of sintering. The sintering temperature is more preferably 800° C. to 880° C. and still more preferably 840° C. to 870° C., but is not limited thereto.

Next, the obtained sintered body is placed in a mold and sized at a pressure of 200 MPa to 700 MPa (sizing step). In this way, it is possible to obtain the bearing 1 consisting of the Cu-based sintered sliding material 10 and having a target shape.

Next, the Cu-based sintered sliding material 10 is impregnated with a lubricating oil such as mineral oils or synthetic oils (synthetic hydrocarbons, synthetic esters, fluorine-based oils, or the like) (lubricating oil-impregnating step). In this way, the pores 12 of the Cu-based sintered sliding material 10 are filled with the lubricating oil, and sufficient lubricity is imparted to the Cu-based sintered sliding material 10.

Sn (melting point of about 232° C.) and Cu—P (melting point of about 714° C.), which have a low melting point, melt during sintering, and Sn and P react with the Cu—Ni alloy powder particles. Therefore, sintering of the Cu—Ni alloy powder particles is carried out, and after the sintering, a structure shown in FIG. 2 is obtained, in which free graphite 13 exists in pore portions in grain boundaries of the alloy grains 11.

In the case of producing the Cu—Ni alloy powder or the Cu—Ni—Sn alloy powder used as raw material powders, an atomizing method is used, in which a molten alloy is rapidly cooled to perform pulverization. In the atomizing method, in general, C may be added to the molten alloy melted in a crucible for the purpose of deoxidation or the like. Since C has a large influence as an impurity, the amount of C added for deoxidation and the melting temperature are controlled in the atomizing method, and a material of the crucible is selected, and thereby, it is possible to control the amount of C contained in the alloy powders.

<Working Effect>

The Cu-based sintered sliding material 10 of the present embodiment is a sintered material obtained by sintering Cu—Ni alloy grains, and the amount of C in the metal matrix 20 including (consisting of) the alloy grains 11 and the grain boundary phases 14 is controlled to be in an appropriate range. Thus, it is possible to reduce a rate of dimensional change before and after sintering. In this way, it is possible to provide a sintered sliding material which hardly causes a large dimensional change such as abnormal shrinkage or expansion before and after sintering, and can be produced with good yield.

Further, in the Cu-based sintered sliding material 10 of the present embodiment, by controlling the amount of Ni, the amount of Sn, and the amount of P contained in the metal matrix 20 to be in suitable ranges, strength and wear resistance thereof are enhanced. Therefore, the Cu-based sintered sliding material 10 is usable as a sliding bearing 1 to be used under a high rotation rate and a high surface pressure.

In particular, in the Cu-based sintered sliding material 10 of the present embodiment, by setting an amount of P to be 0.9% or more, grain boundary phases 14 containing desired amounts of Ni and P as main components are formed in grain boundaries of the alloy grains 11. The grain boundary phases 14 strongly bond the alloy grains 11 to each other (the alloy grains 11 are strongly bonded to each other by the grain boundary phases 14) and the grain boundary phases 14 also enhance wear resistance characteristics of the Cu-based sintered sliding material 10. On the other hand, in the case where the amount of P increases, dimensional stability decreases. According to the Cu-based sintered sliding material 10 of the present embodiment, in order to complement the decreased dimensional stability due to inclusion of P, an appropriate amount of C (Combined) is included in the metal matrix 20, more specifically in the alloy grains 11, and thereby, the dimensional stability is improved and thus it is possible to provide the Cu-based sintered sliding material 10 with high productivity.

EXAMPLES

Hereinafter, the present invention will be described in more detail with reference to examples, but the present invention is not limited to these examples.

<Production of Samples>

First, as raw material powders, several types of Cu—Ni alloy powders and Cu—Ni—Sn alloy powders which have different amounts of Ni, a Sn powder, a Cu-8% P alloy powder, a Ni-11% P alloy powder, and a graphite powder were prepared.

These raw material powders were blended as shown in Table 1 so as to obtain a final component composition as shown in Table 2 below, and 0.5% of zinc stearate was added. The mixture was mixed by a V type mixer for 20 minutes, and then the thus obtained mixed powder was press-molded to produce a green compact. In Table 1, powders which were not blended are indicated by "-".

Next, this green compact was sintered at a predetermined temperature in a range of 760° C. to 900° C. in an endothermic gas atmosphere to obtain a sintered sliding material (Cu-based sintered sliding material). The endothermic gas atmosphere was obtained by a method which included: mixing natural gas and air; and passing the mixture through a heated catalyst to decompose and convert the mixture.

Next, the obtained sintered body was placed in a mold and sized by applying a predetermined pressure in a range of 200 MPa to 700 MPa. Next, the Cu-based sintered material was impregnated with a lubricating oil. As the lubricating oil, it is possible to use an oil having a lubricating action such as mineral oils or synthetic oils (synthetic hydrocarbons, synthetic esters, fluorine-based oils, or the like).

By the above-described steps, a plurality of types of ring-shaped Cu-based sintered sliding materials of examples and comparative examples (Examples 1 to 12 and Comparative Examples 1 to 10) having a dimension of an outer diameter of 18 mm×an inner diameter of 8 mm×a height of 4 mm were prepared as samples. Among these Cu-based sintered sliding materials, the metal structure of Example 6 was observed with an electron microscope. As a result, it was found that a configuration having alloy grains containing Sn and C and containing a Cu—Ni based alloy as a main component, grain boundary phases containing Ni and P as main components, free graphite, and pores, was present.

Table 1 summarizes various parameters at the time of preparing the respective samples.

<Various Tests>

Next, with regard to each sample, the component composition, the porosity, the radial crushing strength as a result of a radial crushing test, the rate of dimensional change before and after sintering, the yield, and the wear resistance as a result of a wear test were measured and are summarized in Table 2.

In the component composition shown in Table 2, the C (Free) column represents mass % of C intervening at grain boundaries as free graphite. In addition, the C (Combined) column represents mass % of C contained in the metal matrix constituted by the alloy grains and the grain boundary phases 14. Furthermore, the C (Total amount) represents the total amount, by mass %, of C contained in the sample as C (Free) and C (Combined).

Each measurement method will be described below.

<Component Composition>

The component composition of a sintered body was obtained by a quantitative analysis method using fluorescent X-rays.

Further, in the total amount of C contained in each sample, the ratio of the amount of C (free) intervening at grain boundaries as free graphite to the amount of C (Combined) which was alloyed with and contained in a metal matrix including (consisting of) alloy grains and grain boundary phases was obtained by the following method.

First, a total amount of C contained in a sintered sliding material of a sample was measured by the infrared absorption method (gas analysis method). Next, analysis of the amount of C (Free) contained as free graphite was carried out according to the method of JIS G1211-1995. The amount of C (Combined) alloyed with and contained in the metal matrix including (consisting of) the alloy grains and the grain boundary phases was obtained by subtracting the amount of the free graphite from the total amount of C.

The amount of impurity carbon in the Cu—Ni alloy powder and the Cu—Ni—Sn alloy powder shown in Table 1 was measured by the infrared absorption method (gas analysis method).

<Porosity>

The porosity was measured in accordance with the open porosity test method of sintered metal material according to JPMA M 02-1992.

<Radial Crushing Test>

A load was applied to a sample having a ring shape in a radial direction, and a test load at the time of breakage of the sample was taken as the radial crushing strength. The radial crushing strength is preferably 150 MPa or more.

<Rate of Dimensional Change>

An outer diameter dimension of a molded body (green compact) was measured in advance before sintering and sintering was carried out. The outer diameter dimension of the sintered body (sintered bearing) after sintering was measured, and the rate of dimensional change before and after sintering was calculated and obtained.

The rate of dimensional change is preferably −1.5% or more and 1% or less.

<Yield>

With respect to 50 samples prepared under the same conditions, the yield was determined based on whether an inner diameter dimension after sizing was within a predetermined dimensional tolerance or outside the dimensional tolerance. The tolerance range was set to 0.006 mm, and a product (sample) with an inner diameter dimension within the tolerance range was regarded as an acceptable product. Furthermore, evaluation of A, B, and C were performed based on the ratio of acceptable products to all products. The evaluation criteria are shown below.

A: the ratio of acceptable products was 95% or more.
B: the ratio of acceptable products was 90% or more and less than 95%.
C: the ratio of acceptable products was less than 90%.

<Wear Resistance Test>

First, a shaft consisting of S45C with ϕ8 mm was inserted into each sample having a ring shape. Furthermore, by applying a constant load in a direction perpendicular to an axial direction of the shaft, a load of 10 MPa of a surface pressure was applied in a radial direction of the sample. In this state, a wear resistance test was conducted by rotating the shaft at 100 m/min for 50 hours. After completion of the test, a test piece was taken out (the sample was removed from the shaft), and the maximum wear depth on a sliding surface (inner circumferential surface of the sample) with the shaft was measured. Based on measurement results, evaluation of A, B, and C for wear resistance was performed according to the following evaluation criteria. This wear test was conducted to simulate the conditions where the sintered bearing was rotated at a high speed with a high surface pressure.

A: the maximum wear depth was 10 μm or less.
B: the maximum wear depth was more than 10 μm and 20 μm or less.
C: the maximum wear depth was more than 20 μm.

TABLE 1

| Category | No. | Cu—Ni—Sn powder | Cu—Ni powder | Sn powder | Graphite powder | Cu—P powder | Ni—P powder | Amount (%) of impurity C in Cu—Ni—Sn powder or Cu—Ni powder | Sintering temperature (° C.) |
|---|---|---|---|---|---|---|---|---|---|
| Example | 1 | Cu—8%Ni—7%Sn: 89.4 | — | 1 | 0.5 | 9.1 | 0 | 0.043 | 760 |
| | 2 | Cu—9%Ni—8%Sn: 87.2 | — | 1 | 1 | 8.8 | 1.8 | 0.052 | 800 |
| | 3 | — | Cu—10%Ni: 72.1 | 10 | 1.5 | 10.0 | 6.4 | 0.024 | 840 |
| | 4 | Cu—15%Ni—1%Sn: 79.5 | — | 7 | 1.1 | 8.8 | 3.6 | 0.065 | 845 |
| | 5 | Cu—15%Ni—3%Sn: 70.6 | — | 7 | 0.8 | 12.5 | 9.1 | 0.063 | 845 |
| | 6 | — | Cu—15%Ni: 76.4 | 6 | 1.2 | 10.0 | 6.4 | 0.050 | 845 |
| | 7 | Cu—20%Ni—1%Sn: 64.2 | — | 8 | 1.4 | 15.0 | 11.8 | 0.054 | 845 |
| | 8 | — | Cu—25%Ni: 76.8 | 6 | 2.1 | 8.8 | 6.3 | 0.042 | 845 |
| | 9 | Cu—30%Ni—1%Sn: 68.8 | — | 1.5 | 2.5 | 16.3 | 10.9 | 0.121 | 860 |
| | 10 | — | Cu—30%Ni: 61.3 | 1.5 | 4.8 | 18.8 | 13.6 | 0.065 | 870 |
| | 11 | — | Cu—35%Ni: 71 | 5 | 3.5 | 15.0 | 5.5 | 0.081 | 880 |
| | 12 | — | Cu—45%Ni: 76 | 6 | 3 | 15.0 | 0 | 0.184 | 900 |
| Comparative Example | 1 | Cu—5%Ni—5%Sn: 79.0 | — | 2 | 4 | 15.0 | 0 | 0.042 | 760 |
| | 2 | — | Cu—45%Ni: 79.3 | 6 | 2 | 10.0 | 2.7 | 0.186 | 880 |
| | 3 | Cu—9%Ni—8%Sn: 90.6 | — | 1 | 0.9 | 7.5 | 0 | 0.055 | 800 |
| | 4 | Cu—9%Ni—8%Sn: 50.8 | — | 0 | 1.5 | 25 | 22.7 | 0.053 | 850 |
| | 5 | — | Cu—15%Ni: 82.5 | 0.5 | 2 | 15 | 0 | 0.051 | 820 |
| | 6 | Cu—15%Ni—1%Sn: 78.7 | — | 9 | 1 | 11.3 | 0 | 0.038 | 820 |
| | 7 | Cu—15%Ni—3%Sn: 87.5 | — | 5 | 0 | 7.5 | 0 | 0.065 | 820 |
| | 8 | Cu—20%Ni—1%Sn: 77.5 | — | 7 | 8 | 7.5 | 0 | 0.058 | 860 |
| | 9 | — | Cu—10Ni: 89.5 | 2 | 1 | 7.5 | 0 | 0.010 | 800 |
| | 10 | Cu—30%Ni—5%Sn: 84.5 | — | 5 | 3 | 7.5 | 0 | 0.252 | 845 |

TABLE 2

| Category | No. | Ni | Sn | P | C (Total amount) | C (Free) | C (Combined) | Cu | Rate of dimensional change (%) | Yield | Porosity (%) | Radial crushing strength (MPa) | Wear resistance | Remarks |
|---|---|---|---|---|---|---|---|---|---|---|---|---|---|---|
| Example | 1 | 7.2 | 7.2 | 1 | 0.54 | 0.501 | 0.039 | Remainder | −1.4 | B | 13.5 | 308 | B | |
| | 2 | 9.4 | 8.0 | 0.9 | 0.99 | 0.936 | 0.054 | Remainder | −1.2 | B | 15.7 | 263 | B | |
| | 3 | 12.9 | 9.9 | 1.5 | 1.5 | 1.479 | 0.021 | Remainder | −1 | A | 19.8 | 225 | A | |
| | 4 | 14.5 | 7.8 | 1.1 | 1.03 | 0.70 | 0.070 | Remainder | −0.8 | A | 17.4 | 290 | A | |
| | 5 | 18.8 | 9.2 | 2.0 | 0.8 | 0.739 | 0.061 | Remainder | −1.1 | A | 21.6 | 329 | A | |
| | 6 | 17.2 | 6.0 | 1.5 | 1.2 | 1.144 | 0.056 | Remainder | −0.9 | A | 20.2 | 314 | A | |
| | 7 | 23.5 | 8.6 | 2.5 | 1.4 | 1.339 | 0.061 | Remainder | −0.6 | A | 22.6 | 344 | A | |
| | 8 | 25.0 | 6.2 | 1.4 | 2.1 | 2.062 | 0.038 | Remainder | −0.5 | A | 21.9 | 332 | A | |
| | 9 | 30.2 | 2.2 | 2.5 | 2.5 | 2.372 | 0.128 | Remainder | −0.3 | A | 18.8 | 397 | A | |
| | 10 | 30.5 | 1.4 | 2.9 | 4.7 | 4.635 | 0.065 | Remainder | 0 | A | 27.3 | 293 | A | |
| | 11 | 29.8 | 5.0 | 1.8 | 3.6 | 3.508 | 0.092 | Remainder | −0.2 | A | 23.5 | 347 | A | |
| | 12 | 34.2 | 6.0 | 1.5 | 1 | 0.817 | 0.183 | Remainder | 0.3 | A | 21.7 | 476 | A | |
| Comparative Example | 1 | 4.0 | 5.9 | 1.2 | 4.1 | 4.047 | 0.041 | Remainder | −1.8 | C | 16.7 | 125 | C | |
| | 2 | 38.1 | 6.0 | 1.1 | 2.3 | 2.143 | 0.177 | Remainder | 0.9 | A | 25.7 | 467 | A | High cost |
| | 3 | 8.2 | 8.3 | 0.6 | 0.9 | 0.859 | 0.053 | Remainder | −0.5 | A | 23.9 | 165 | C | |

TABLE 2-continued

| Category | No. | Component composition (mass %) | | | | | | | Rate of dimensional change (%) | Yield | Porosity (%) | Radial crushing strength (MPa) | Wear resistance | Remarks |
|---|---|---|---|---|---|---|---|---|---|---|---|---|---|---|
| | | Ni | Sn | P | C (Total amount) | C (Free) | C (Combined) | Cu | | | | | | |
| | 4 | 24.8 | 4.1 | 4.5 | 1.3 | 1.223 | 0.057 | Remainder | −3.9 | C | 15.3 | 265 | B | |
| | 5 | 12.4 | 0.5 | 1.2 | 2.0 | 1.949 | 0.051 | Remainder | −0.9 | A | 13.7 | 138 | C | |
| | 6 | 11.8 | 15.3 | 0.9 | 1.0 | 0.959 | 0.041 | Remainder | 1.5 | C | 24.5 | 278 | A | |
| | 7 | 13.2 | 7.6 | 0.9 | 0.05 | 0.0 | 0.051 | Remainder | −2.3 | C | 19.8 | 338 | C | |
| | 8 | 15.1 | 7.8 | 0.9 | 7.8 | 7.737 | 0.063 | Remainder | 0.5 | A | 25.1 | 103 | C | |
| | 9 | 9.0 | 2.9 | 0.9 | 1.0 | 0.988 | 0.012 | Remainder | −2.7 | C | 16.2 | 326 | B | |
| | 10 | 25.4 | 9.3 | 0.9 | 3.0 | 2.745 | 0.255 | Remainder | 1.6 | C | 22.7 | 367 | A | |

<Discussion>

From Table 2, with regard to the samples of Examples 1 to 12, all of the rate of dimensional change, the yield, the radial crushing strength, and the wear resistance fell within the preferable ranges.

With regard to the sample of Comparative Example 1, the radial crushing strength and the wear resistance were low. It is considered that the sample of Comparative Example 1 was insufficient in strength because the amount of Ni was small. In addition, it was confirmed from the rate of dimensional change and the yield that the sample of Comparative Example 1 had low dimensional stability.

With regard to the sample of Comparative Example 2, all of the rate of dimensional change, the yield, the radial crushing strength, and the wear resistance fell within the preferable ranges. However, the sample of Comparative Example 2 contained 35% or more of Ni, which had a problem of high material cost. Sliding bearings consisting of a sintered sliding material are adopted due to cost advantages relative to rolling bearings such as bearings. In view of this point, the sample of Comparative Example 2 having high material cost is not preferable as a sintered sliding material used for a bearing.

The sample of Comparative Example 3 had low wear resistance. In addition, although the sample of Comparative Example 3 met the criteria of 150 MPa, the radial crushing strength was relatively low. The amount of P was small in the sample of Comparative Example 3. P together with Ni or the like form a solid solution (grain boundary phases 14 containing Ni and P as main components), and thereby, P enhances the wear resistance and strength of the Cu-based sintered sliding material. It is considered that the sample of Comparative Example 3 was insufficient in wear resistance because the amount of P was small.

It can be seen that the sample of Comparative Example 4 had low dimensional stability from the fact that the rate of dimensional change and the yield were poor. The amount of P was more than 3% in the sample of Comparative Example 4. In the case where the amount of P exceeds 3%, dimensional change during sintering increases and dimensional accuracy decreases. It is considered that the dimensional accuracy decreased in the sample of Comparative Example 4 because the amount of P was excessively large.

With regard to the sample of Comparative Example 5, the radial crushing strength and the wear resistance were low. The amount of Sn in the sample of Comparative Example 5 was less than 1%. Sn together with Ni or the like form a solid solution, and thereby, Sn enhances strength and wear resistance of the Cu-based sintered sliding material. It is considered that the sample of Comparative Example 5 was insufficient in strength because a sufficient amount of the solid solution was not formed.

The sample of Comparative Example 6 had low dimensional stability from the rate of dimensional change and the yield. The amount of Sn in the sample of Comparative Example 6 was more than 10%. In the case where the amount of Sn exceeds 10%, dimensional change during sintering increases and dimensional accuracy decreases. It is considered that the dimensional accuracy in the sample of Comparative Example 6 decreased because the amount of Sn was excessively large.

The sample of Comparative Example 7 had low dimensional stability from the rate of dimensional change and the yield. With regard to the sample of Comparative Example 7, the amount of free graphite was less than 0.3%. As a result, it is considered that the dimensional stability was low from the rate of dimensional change and the yield, and in addition, it is considered that lubricity became insufficient and thereby, the wear resistance decreased.

With regard to the sample of Comparative Example 8, the radial crushing strength and the wear resistance were low. In the sample of Comparative Example 8, the amount of C (Free) existing in grain boundaries as free graphite was excessively large. Therefore, it is considered that the free graphite prevented the alloy grains from binding together and thereby, the strength and the wear resistance of the Cu-based sintered sliding material were decreased.

The sample of Comparative Example 9 shrinked to be very small in dimension, and thereby, the yield was poor. In the sample of Comparative Example 9, the amount of C (Combined) alloyed with and contained in a metal matrix including (consisting of) alloy grains and grain boundary phases was less than 0.02%. In the case where the amount of C (Combined) is less than 0.02%, sintering among the raw material powders is not inhibited, and sintering is promoted, and thereby, excessive dimensional shrinkage due to sintering occurs. Therefore, it is considered that the sample of Comparative Example 9 was poor in yield.

With regard to the sample of Comparative Example 10, the rate of dimensional change was a positive value. That is, it was found that the sintered sliding material expanded due to sintering. In the sample of Comparative Example 10, the amount of C (Combined) alloyed with and contained inside the alloy grains was more than 0.20%. From this result, it was confirmed that in the case where the amount of C (Combined) exceeded 0.20%, the dimensions increased due to sintering.

From the above-described results, it was confirmed that as long as the samples satisfy the conditions of the present invention, it is possible to provide a sintered oil-impregnated bearing having good yield due to a low rate of dimensional change, high radial crushing strength, and excellent wear resistance.

Although embodiments and examples of the present invention have been described above, the respective configurations in the embodiments and examples, combinations thereof, and the like are merely illustrative, and additions, omissions, substitutions, and other changes to the configurations may be made within a scope that does not depart from the features of the present invention. In addition, the present invention is not limited by the embodiments and examples.

INDUSTRIAL APPLICABILITY

The Cu-based sintered sliding material of the present invention is usable as a bearing in a rotating system used under a condition of high speed rotation and high surface pressure such as a starter motor or an electric compressor of an automobile, and ABS in a state that the Cu-based sintered sliding material of the present invention is in the form of a sintered oil-impregnated bearing.

REFERENCE SIGNS LIST

1: bearing
10: Cu-based sintered sliding material
11: alloy grain
12: pore
13: free graphite
14: grain boundary phase
20: metal matrix

The invention claimed is:

1. A Cu-based sintered sliding material having a composition comprising, by mass %:
 7% to 35% of Ni;
 1% to 10% of Sn;
 1% to 3% of P;
 0.5% to 5% of C; and
 a remainder of Cu and inevitable impurities,
 wherein the Cu-based sintered sliding material includes a sintered body including: alloy grains that contain Sn and C and contain a Cu—Ni-based alloy as a main component; grain boundary phases that contain Ni and P as main components and are dispersedly distributed in grain boundaries of the alloy grains; and free graphite that intervenes at the grain boundaries of the alloy grains,
 the Cu-based sintered sliding material has a structure in which pores are dispersedly formed in the grain boundaries of the alloy grains, and
 an amount of C in a metal matrix including the alloy grains and the grain boundary phases is, by mass %, 0.02% to 0.20%.

2. The Cu-based sintered sliding material according to claim 1,
 wherein a porosity is 13% to 28%.

3. A method for producing a Cu-based sintered sliding material, the method comprising:
 a mixing step of mixing a plurality of types of powders to obtain a mixed powder;
 a molding step of press-molding the mixed powder to obtain a green compact;
 a sintering step of sintering the green compact to obtain a sintered body; and
 a sizing step of sizing the sintered body,
 wherein the plurality of types of powders include metal powders and a graphite powder, and the plurality of types of powders are blended and mixed so as to have a total composition including, by mass %, 7% to 35% of Ni, 1% to 10% of Sn, 1% to 3% of P, and 0.5% to 5% of C, with a remainder of Cu and inevitable impurities, and
 the metal powders contain, by mass %, 0.02% to 0.20% of C.

4. The method for producing a Cu-based sintered sliding material according to claim 3,
 wherein, in the sintering step, the green compact is sintered at a temperature of 760° C. to 900° C.

5. The method for producing a Cu-based sintered sliding material according to claim 3,
 wherein a porosity of the sintered body is made to be 13% to 28%.

6. The method for producing a Cu-based sintered sliding material according to claim 4,
 wherein a porosity of the sintered body is made to be 13% to 28%.

* * * * *